UNITED STATES PATENT OFFICE.

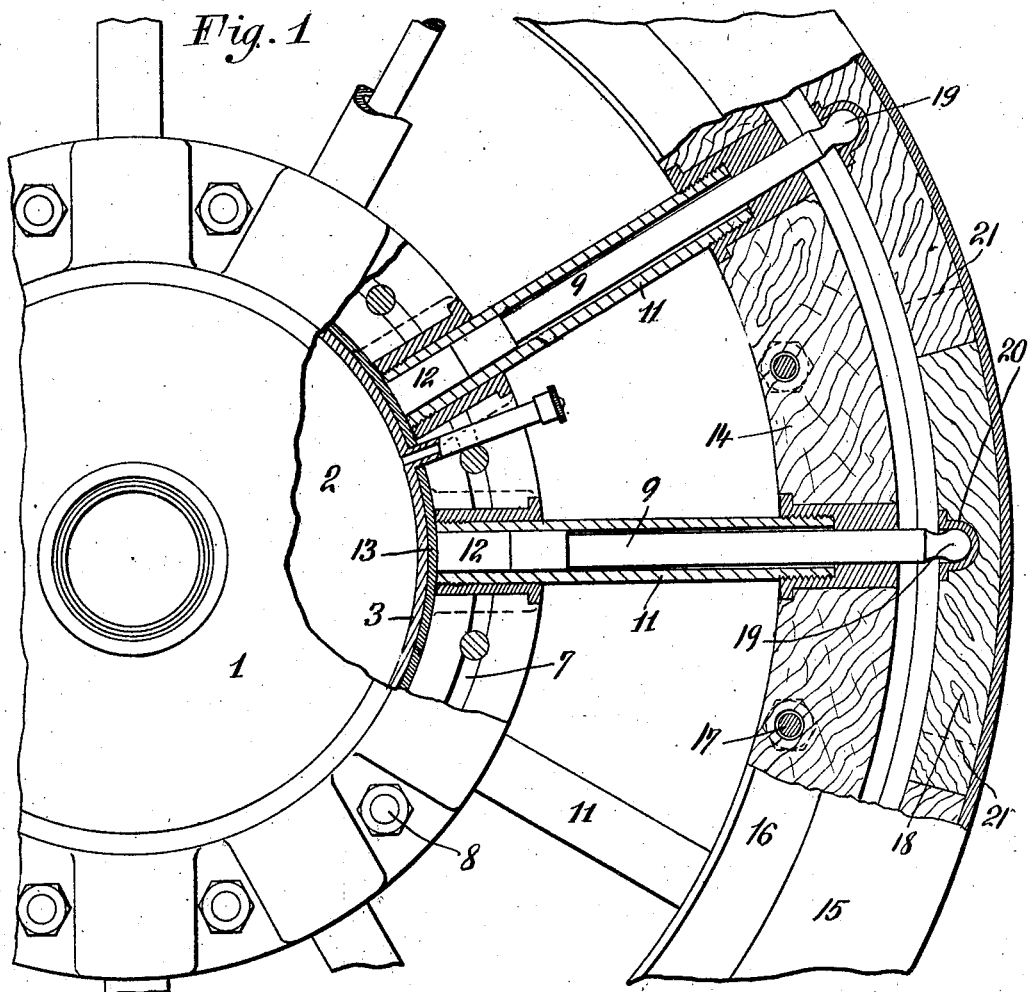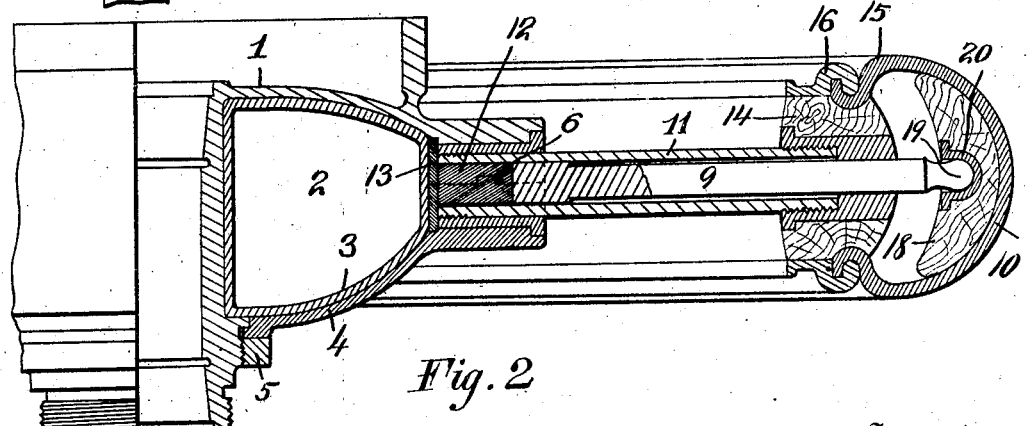

JOHN MILLAR, OF ARLINGTON, NEW JERSEY, ASSIGNOR OF ONE-HALF TO DUNCAN CAMPBELL, OF ARLINGTON, NEW JERSEY.

CUSHION-WHEEL.

1,047,268.  Specification of Letters Patent.  Patented Dec. 17, 1912.

Application filed March 3, 1911. Serial No. 612,129.

*To all whom it may concern:*

Be it known that I, JOHN MILLAR, a subject of the King of Great Britain and Ireland, and a resident of Arlington, in the county of Hudson and State of New Jersey, have invented certain new and useful Improvements in Cushion-Wheels, of which the following is a specification.

The object of my invention is to secure in a cushion wheel all the flexibility and resiliency of a pneumatic tired wheel without the liability of puncture and wear attending the use of the ordinary pneumatically tired wheel. This object I attain by locating the cushioning means within the hub of the wheel where it will be fully protected, instead of out on the rim of the wheel, as in the case of a pneumatic tire.

Accordingly, my invention consists in the provision of a hub having an annular recess therein in which is located suitable cushioning means, such as a pneumatic cushion, and a series of radially disposed plungers bearing upon the pneumatic cushion and which serve to transmit the road shocks from the tread to the cushion. These plungers are preferably guided within hollow spokes radiating from the hub and for the purpose of providing the necessary rigidity and strength, these spokes are preferably connected by a rim, to which the tread may be flexibly secured. To protect the pneumatic cushion from as much wear as possible, a band or strip of wearing material is preferably interposed between the pneumatic cushion and the inner ends of the plungers.

Another feature of my invention consists in entirely inclosing the plungers so as to protect them from wear and to prevent grit and foreign matter from gaining access to the working parts of the wheel. This I preferably accomplish by causing the sliding plungers to be wholly incased within the hollow spokes and the rim carried by such spokes, and in inclosing the outer ends of the plungers within the tread.

Various other objects and features of the invention will appear as the specification proceeds.

In the accompanying drawings I have illustrated a preferred embodiment of my invention but it will be understood that various changes and modifications may be made therein without departing from the spirit and scope of the invention.

In the drawings: Figure 1 is a broken view, partly in section, of a cushion wheel constructed in accordance with and embodying my invention. Fig. 2 is a cross sectional view of the same.

Like reference characters refer to like parts throughout the several views.

According to my invention the cushioning means for the wheel instead of being carried by the rim, is contained within the hub of the wheel, and for this reason the hub 1, which may be of any desired size and shape, according to the work for which the wheel is intended, is provided with an annular chamber or space 2 therein, within which is located the cushioning means, the said cushioning means preferably being in the form of a pneumatic cushion 3. For convenience in assembling the parts, one of the walls of this inner chamber is preferably made removable, as by being in the form of an annular member 4 which is slipped over the end of the hub and may be secured in place thereon by any suitable means, such as the screw ring 5. To secure a close fitting engagement between this annular member 4 and the hub, one of these parts preferably carries an annular flange 6 which fits into a rabbet or groove 7 in the other member. And these meeting portions are preferably secured together by suitable fastening means, such as the bolts 8. The cushion chamber within the hub preferably tapers outwardly in shape, as shown, and the pressure is therefore borne upon the so-called apex of the pneumatic cushion contained therein (see particularly Fig. 2).

A series of radially disposed plungers 9 serve as a means of connection to transmit the road shocks from the tread 10 of the wheel to the cushioning means. These plungers are slidingly guided within the hub and for this reason the wheel is preferably provided with hollow spokes 11 in which the plungers are seated. More or less yielding cushioning members 12 may be placed between the inner ends of the plungers and the pneumatic cushion. These members may be of hard rubber. And to protect the pneumatic cushion against wear there is preferably provided a ring or strip of wearing material 13 which has a direct bearing upon the cushion. This strip of wearing material may be of rubber or rubber fabric. The outer ends of the spokes are preferably connected by a rim 14 which gives the necessary rigidity and strength to the wheel. The form of the tread may vary. It preferably consists of, and is so shown in the present instance, as a rubber tire 15 which has its edges secured to the rim by suitable clamping rings 16; bolts 17, or other fastening means being employed for securing these clamping rings in place. This tire is preferably held in a more or less distended position by means of suitable filling blocks 18, which may be of wood and which have a direct bearing upon the outer ends of the plungers. These blocks serve to distribute the force of the thrust, and the blocks have connection with the plungers preferably by means of a ball and socket joint 19 and 20. The meeting ends of the blocks preferably overlap or interlock in some way as by means of a mortise joint 21 as indicated in Fig. 1. From the foregoing it will be noted that the sliding plungers are thus inclosed for their full length by the hollow spokes, the rim, and the tread, so that all working parts shall be entirely protected against the entrance of grit and dirt. Also by so inclosing the plungers and working parts, the appearance of the wheel is not marred in any way since none of the working mechanism is visible.

One of the important features of my invention consists in joining the ends of the spokes together with a rigid rim so as to produce a solid unitary structure and in causing the sliding plungers to enter the spokes through the rim in the manner substantially as illustrated in the drawings.

In prior cushion wheel patents which I am aware of wherein sliding plungers are used operating within hollow spokes, the joints between the plungers and spokes are wholly unprotected so that any lateral strains upon the wheel must be borne by these sliding joints between the plungers and the hollow spokes. This objection is wholly overcome in my invention for, as shown in the drawings, it will be noted that the joints between the sliding plungers and the spokes are carried within the rim so that any lateral strains upon the plungers will be borne directly by the rim. The inner faces of the filler blocks are preferably shaped as indicated in Fig. 2 to correspond in general to the outer face of the rim so that in case of a very heavy shock the filler block will mesh upon the rim and the shock will then be borne by such rim.

What is claimed, is:

1. In a cushion wheel, a hub having an annular chamber therein, a pneumatic cushion contained within the said chamber, a rigid rim, spokes connecting said hub and rim, a tire connected to the rim, spacing blocks between said rim and tire shaped to fit the rim, plungers resting on said cushion, and ball and socket joints between the plungers and the spacing blocks.

2. A cushion wheel comprising a hub having an annular chamber therein, a pneumatic cushion contained and wholly inclosed within said chamber, hollow spokes radiating from the hub, a rigid rim engaged by the outer ends of the spokes, plungers slidingly engaged within the hollow spokes, resilient cushioning members slidingly engaged in the inner ends of the spokes between the inner ends of the plungers and the pneumatic cushion, bearings located within the rim for guiding the outer portions of the sliding plungers, and a tread carried by the outer ends of the plungers.

3. A cushion wheel comprising a hub having an annular chamber therein, a pneumatic cushion contained and wholly inclosed within said chamber, hollow spokes radiating from the hub, a rigid rim engaged by the outer ends of the spokes to rigidly unite the spokes to each other, said rim having a transversely convex outer surface, plungers slidingly engaged within the hollow spokes and bearing with their inner ends upon the pneumatic cushion, bearings located within the rim for guiding the outer portions of the sliding plungers, said plungers, with the exception of the portions projecting beyond the rim, being entirely inclosed within the hollow spokes, a tire connected with the rim, and filling blocks flexibly engaged upon the outer ends of the plungers for holding the tire normally distended, the said blocks shaped with a transversely extending curvature on their inner faces to correspond to the outer face of the rim whereby upon a severe shock the filling blocks will mesh against the rim to transmit the shock to the rigid rim.

4. A cushion wheel comprising a hub having an annular chamber therein, a pneumatic cushion contained and wholly inclosed within said chamber, hollow spokes radiating from the hub, a rigid rim engaged by the outer ends of the spokes, cushioning members disposed in the inner ends of the hollow spokes, plungers slidingly engaged within the hollow spokes and bearing with their inner ends upon the cushioning members, a wearing strip interposed between the pneumatic cushion and the inner ends of the cushioning members, bearings located within the rim for guiding the outer portions of the sliding plungers, said sliding plungers, except for the portions projecting beyond the rim, being wholly inclosed within the hollow spokes, a tire connected with the rim, and filling blocks for normally holding said tire distended, said filling blocks being flexibly connected with the outer ends of the plungers and having inner faces shaped to correspond to the outer faces of the rim, whereby upon a heavy shock the filling blocks will mesh against the rim.

5. In a cushion wheel, a hub having an annular chamber therein, a pneumatic cushion contained and wholly inclosed within the said chamber, a rigid rim, hollow spokes connecting the hub and rim, plungers slidingly guided and inclosed within the hollow spokes, said plungers resting with their inner ends upon the pnuematic cushion, a tread shaped on its inner face to engage and fit the rim, and ball and socket joints between the outer ends of the plungers and the said tread.

Signed at Harrison in the county of Hudson and State of New Jersey this 27th day of February A. D. 1911.

JOHN MILLAR.

Witnesses:
 JOHN PATERSON, Jr.,
 GEORGE PATERSON.

Copies of this patent may be obtained for five cents each, by addressing the "Commissioner of Patents, Washington, D. C."